United States Patent
Jeong

(10) Patent No.: US 6,275,456 B1
(45) Date of Patent: Aug. 14, 2001

(54) METHOD OF PROCESSING DATA OF DEFECT SECTOR IN A DVD-RAM SYSTEM AND THE DVD-RAM SYSTEM.

(75) Inventor: Jong-Sik Jeong, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/222,829

(22) Filed: Dec. 30, 1998

(30) Foreign Application Priority Data

Dec. 31, 1997 (KR) .................................................. 97-80543

(51) Int. Cl.$^7$ .................................................. G11B 7/005
(52) U.S. Cl. ........................................................ 369/47.14
(58) Field of Search .................. 369/47.14, 53.16–53.17, 369/32; 360/39, 47, 48, 53

(56) References Cited

U.S. PATENT DOCUMENTS

| | | | |
|---|---|---|---|
| 5,237,553 | * | 8/1993 | Fukushima et al. .................... 369/58 |
| 5,526,335 | * | 6/1996 | Tamegai .................................. 369/58 |
| 5,648,954 | * | 7/1997 | Satoh ................................... 369/275.1 |
| 5,732,050 | * | 3/1998 | Horie ....................................... 369/32 |
| 5,805,547 | * | 9/1998 | Yamamuro ............................... 369/58 |
| 6,014,350 | * | 1/2000 | Tamegai .................................. 369/32 |
| 6,025,966 | * | 2/2000 | Nemazie et al. ........................ 360/53 |
| 6,029,209 | * | 2/2000 | Cornaby et al. .......................... 710/5 |
| 6,052,348 | * | 4/2000 | Belser et al. ............................ 369/54 |

* cited by examiner

Primary Examiner—W. R. Young
(74) Attorney, Agent, or Firm—Staas & Halsey LLP

(57) ABSTRACT

A method of processing data of a defect sector in a DVD-RAM (Digital Video Disk-Random Access Memory) system and the DVD-RAM system. In the method, a defect list is read from a lead-in area of a DVD-RAM disk during playback of the disk and stored in a predetermined area of a memory of a signal processing portion in the system. A sector having the title of a user-input file is searched, a physical sector address for the searched sector is designated, the defect list is read, and it is determined whether the physical sector address is in the defect list. Then, sector data corresponding to the physical sector address is stored in the memory of the signal processing portion if the physical sector address is not in the defect list, and otherwise, no sector data corresponding to the physical sector address is stored in the memory.

7 Claims, 6 Drawing Sheets

| PHYSICAL SECTOR ADDRESS | DATA OF 2366 BYTES | PHYSICAL SECTOR ADDRESS | DATA OF 2366 BYTES | ... |

FIG. 1  PRIOR ART

METHOD OF PROCESSING DATA OF DEFECT SECTOR IN A DVD-RAM SYSTEM AND THE DVD-RAM SYSTEM.

CROSS-REFERENCE TO RELATED APPLICATIONS

This application claims the benefit of Korean Application No. 80543/1997, filed Dec. 31, 1997, in the Korean Patent Office, the disclosure of which is incorporated herein by reference.

BACKGROUND OF THE INVENTION

1. Field of the Invention

The present invention relates to a DVD-RAM (Digital Video Disk-Random Access Memory) system, and in particular, to a method of processing the data of a defect sector referring to a defect list having physical defect information on a disk.

2. Description of the Related Art

In general, a disk has defect areas unavailable for recording data due to physical causes in a DVD-RAM system. Such defect areas are empty of data and their smallest unit is a data sector. A sector in a defect area is called a defect sector, and the information of the defect sector is generally stored in a lead-in area of a DVD-RAM disk.

FIG. 1 illustrates a data format for a general DVD-RAM disk, with a physical sector address preceding data to be error-corrected.

Since the information of a defect sector in the lead-in area is stored in an additional defect information memory, it is determined whether a physical sector address for each sector data indicates a defect sector referring to a defect list having the information of defect sector data in the defect information memory when the physical sector address shown in FIG. 1 is read during a playback of the DVD-RAM disk in the DVD-RAM system. If the physical sector address does not indicate a defect sector, the data following the physical sector address is stored in an error correction memory and subjected to error correction.

FIG. 2 is a block diagram of a signal processing portion 236 in the general DVD-RAM system to which the present invention is applied. Referring to FIG. 2, a memory 224 serves as an error correction memory and stores data in 16 data sector units. A microcomputer interface 226 interfaces data transmitted between components of the signal processing portion 236. A microcomputer 228 controls the entire operation of the signal processing portion 236 as well as that of the DVD-RAM system.

When reproducing a disk 200, a disk motor 204 starts to rotate at a constant linear velocity, and an optical pickup 202 including a head converts disk information to an analog high frequency signal. The analog high frequency signal is converted to a pulse wave signal and a data stream EFM is applied to a 32-bit shift register 206. The lower 16 bits of 32 bits output from the 32-bit shift register 206 are provided to a 16-to-8 demodulator 208. The 16-to-8 demodulator 208 converts the received 16-bit data to 8-bit data as one symbol because data was 8-to-16 modulated during recording.

A physical sector address detector 230 detects a physical sector address from the data received from the 16-to-8 demodulator 208. A physical sector address error corrector 234 corrects errors of the physical address received from the physical sector address detector 230. A data address detector/error corrector 232 detects a data address from the data received from the 16-to-8 demodulator 208 and corrects errors of the data address. A sync detector 210 detects various sync patterns like a frame sync signal being a standard signal for controlling the rotation of the disk 200, a sector sync signal for differentiating sectors, and an error correction sync signal for reading the data of a corresponding error correction block by finding out an error correction time point, and generates sync signals.

A descrambler 214 descrambles scrambled data recorded on the DVD to return the scrambled data to the state prior to scrambling. An error detector 216 detects errors from the data received from the descrambler 214. A deinterleaver 218 deinterleaves data interleaved in frame units to return the data to its original arranged state by controlling a write/read address of the memory 224. An ATAPI (AT Attachment Packet Interface) interface 222 interfaces data between the signal processing portion 236 and a computer. AN ATAPI buffer memory 238 temporarily buffers the data interfaced between the computer and the signal processing portion 236. A memory controller 220 stores data read from the disk 200 in the memory 224 in 16 sector units. An error corrector 212 corrects errors of a predetermined block having data read from the disk. A defect information memory 240 stores a defect list having information of defect sectors read from the lead-in area of the disk 200.

As shown in FIG. 2, the defect information memory is additionally provided in the prior art to store the defect sector information, thereby requiring an additional memory access means for controlling the defect information memory and increasing the number of memories.

SUMMARY OF THE INVENTION

An object of the present invention is to provide a method for processing the data of a defect sector, which can reduce the number of memories by storing a defect list in a predetermined area of a memory of a conventional DVD-RAM system.

Additional objects and advantages of the invention will be set forth in part in the description which follows and, in part, will be obvious from the description, or may be learned by practice of the invention.

To achieve the above and other objects and advantages, there is provided a method for processing the data of a defect sector in a DVD-RAM system. In the method, a defect list is read from a lead-in area of a DVD-RAM disk during playback of the disk and stored in a predetermined area of a memory of a signal processing portion in the system. A sector having the title of a user-input file is searched, a physical sector address for the searched sector is designated, the defect list is read, and it is determined whether the physical sector address is in the defect list. Then, sector data corresponding to the physical sector address is stored in the memory of the signal processing portion if the physical sector address is not in the defect list, and otherwise, no sector data corresponding to the physical sector address is stored in the memory.

BRIEF DESCRIPTION OF THE DRAWINGS

The above and other objects and advantages of the present invention will become more apparent by describing in detail a preferred embodiment thereof with reference to the attached drawings in which:

FIG. 1 illustrates a data format for a general DVD-RAM disk;

DETAILED DESCRIPTION OF THE PREFERRED EMBODIMENT

Figure 2:
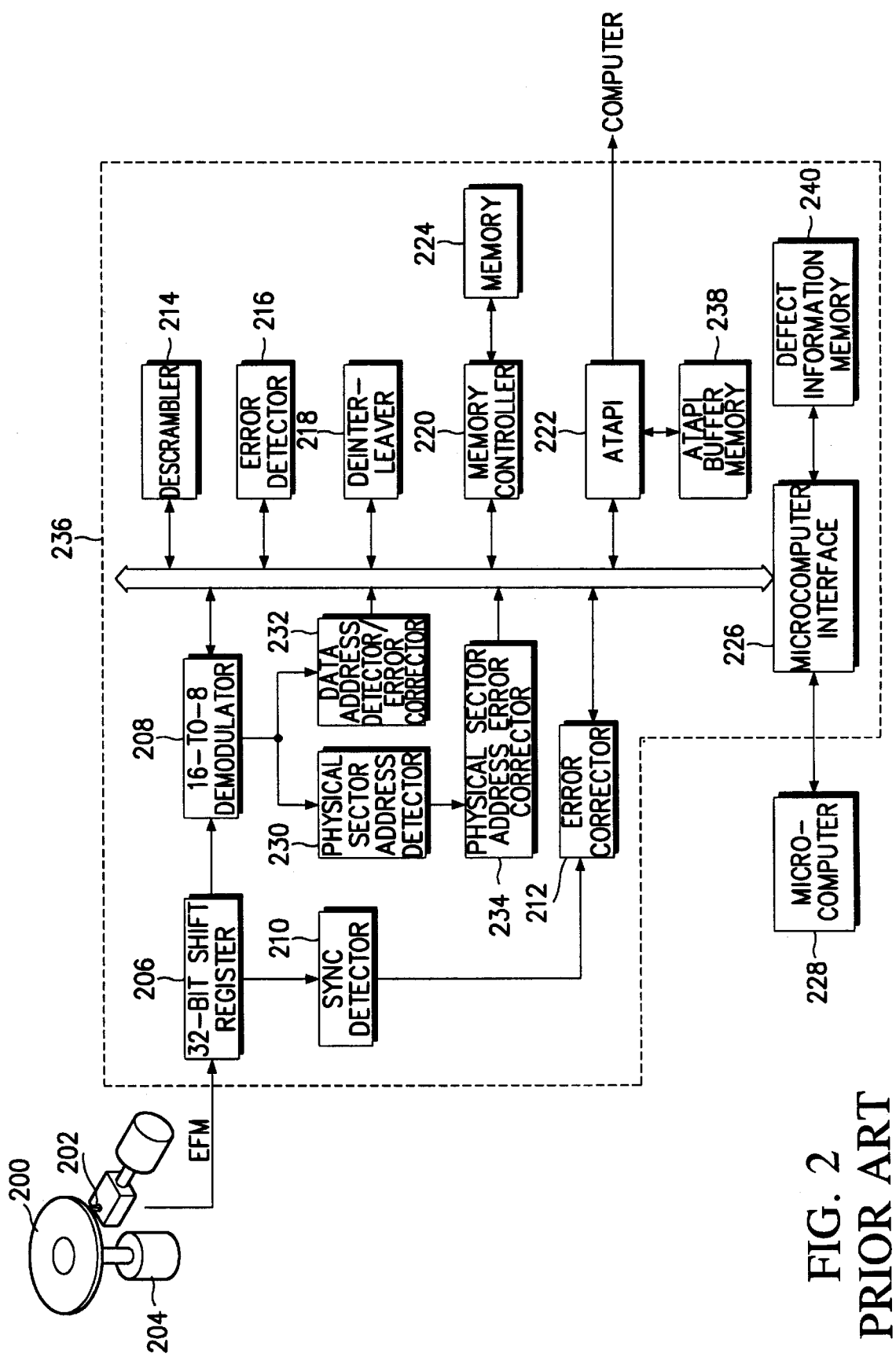
FIG. 2 is a block diagram of a signal processing portion in a conventional DVD-RAM system.
Figure 3:
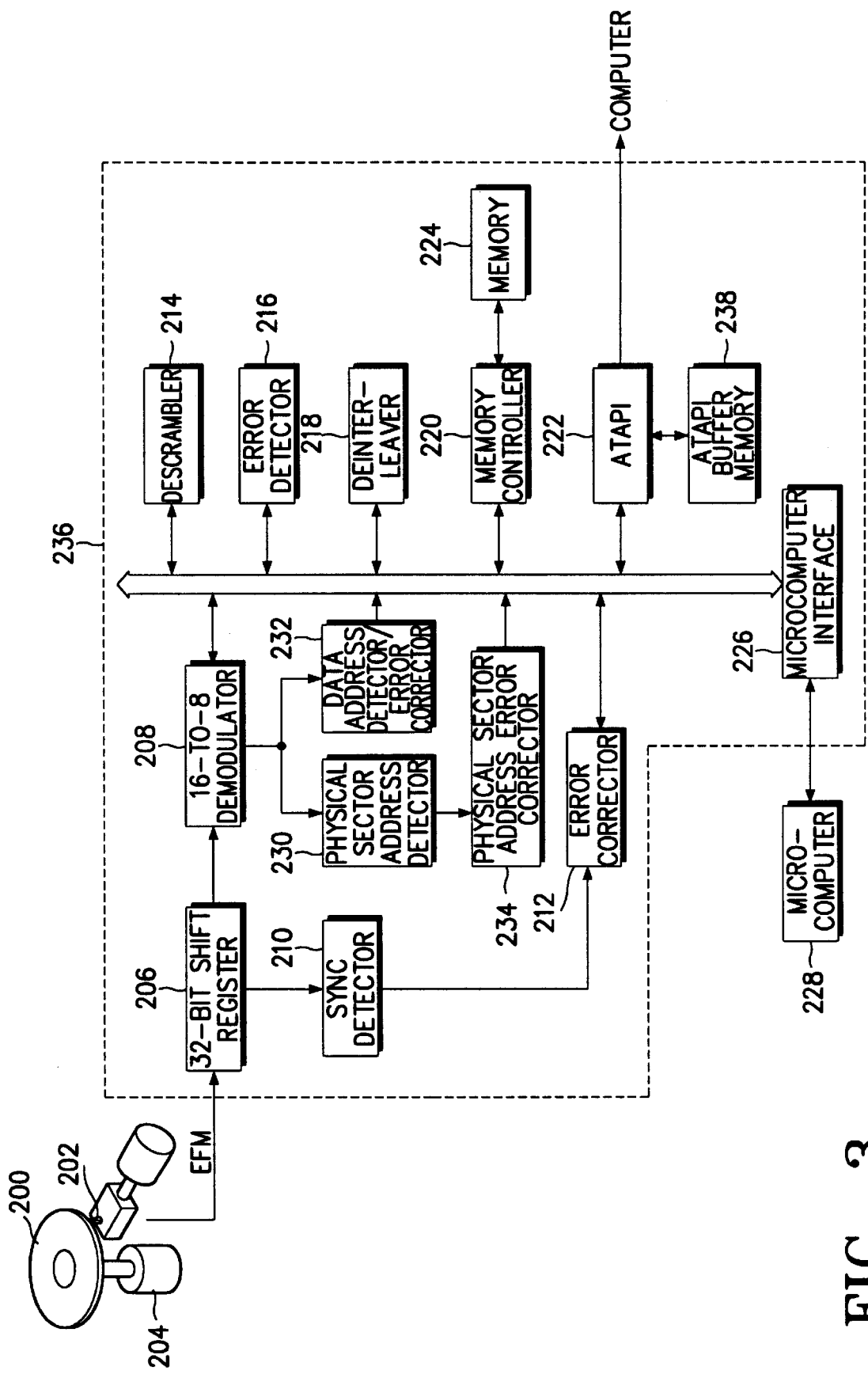
FIG. 3 is a block diagram of a signal processing portion in a DVD-RAM system according to an embodiment of the present invention.

FIG. 3 is a block diagram of a DVD-RAM system according to an embodiment of the present invention. The DVD-RAM system is similar to the conventional one except that a defect list is stored in both the memory 224 and the ATAPI buffer memory 238, and the defect information memory 240 is omitted. The other blocks except for the memory 224 in FIG. 3 are operated in the same manner as those of FIG. 2 and their functions will not be described here.

Figure 4:
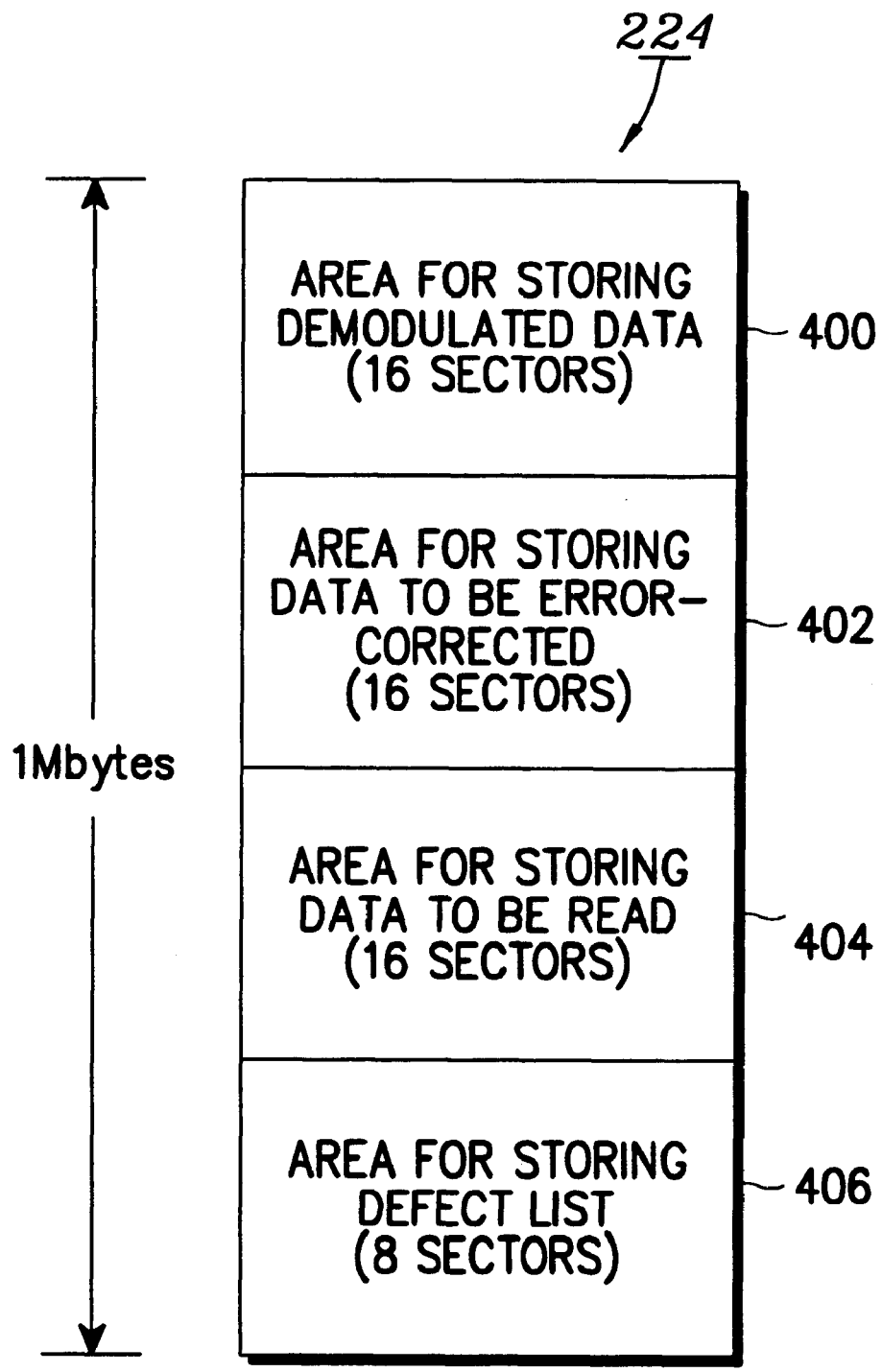
FIG. 4 schematically illustrates a data storage structure of a memory in the signal processing portion according to the embodiment of the present invention.

FIG. 4 illustrates the data storage structure of the memory 224 according to the embodiment of the present invention. Referring to FIG. 4, the memory 224 is divided into four areas: a first area 400 for storing demodulated data in 16 sector units; a second area 402 for storing data to be error-corrected; a third area 404 for storing data to be read as a final result; and a fourth area 406 for storing the defect list according to the embodiment of the present invention. In the general DVD-RAM system, the memory 224 usually has a capacity of one Mbyte and the demodulated data, error correction data, and data to be read as a final result are stored respectively in 16 sector units (16 sectors=one error correction block=37,856 bytes). Since there are 17 memory addresses in the memory 224, a total memory storage capacity is $2^{17}$, that is, 13,1072 bytes. About 17,504 bytes, that is, eight sectors with one sector having 2048 bytes are allocated to the fourth area 406 by subtracting a memory capacity allocated to the first three areas 400, 402, and 404 from the total memory capacity. Therefore, 8-sector information of the defect list at a maximum can be stored in a predetermined area of the memory 224 of the signal processing portion 236. Though the maximum size of a defect list designated in the general DVD-RAM disk format reaches 46 kbytes, that is, 32 sectors, the physical defect information of most DVD-RAM disks occupies 16 or less Kbytes, that is, eight or less sectors. Thus, the defect list can be processed by use of the memory 224. If the physical defect information exceeds 16 Kbytes, the remaining part of the defect list is stored in the ATAPI buffer memory 238 for the ATAPI 222 and applied to the memory controller 220 in the signal processing portion 236.

Figure 5:
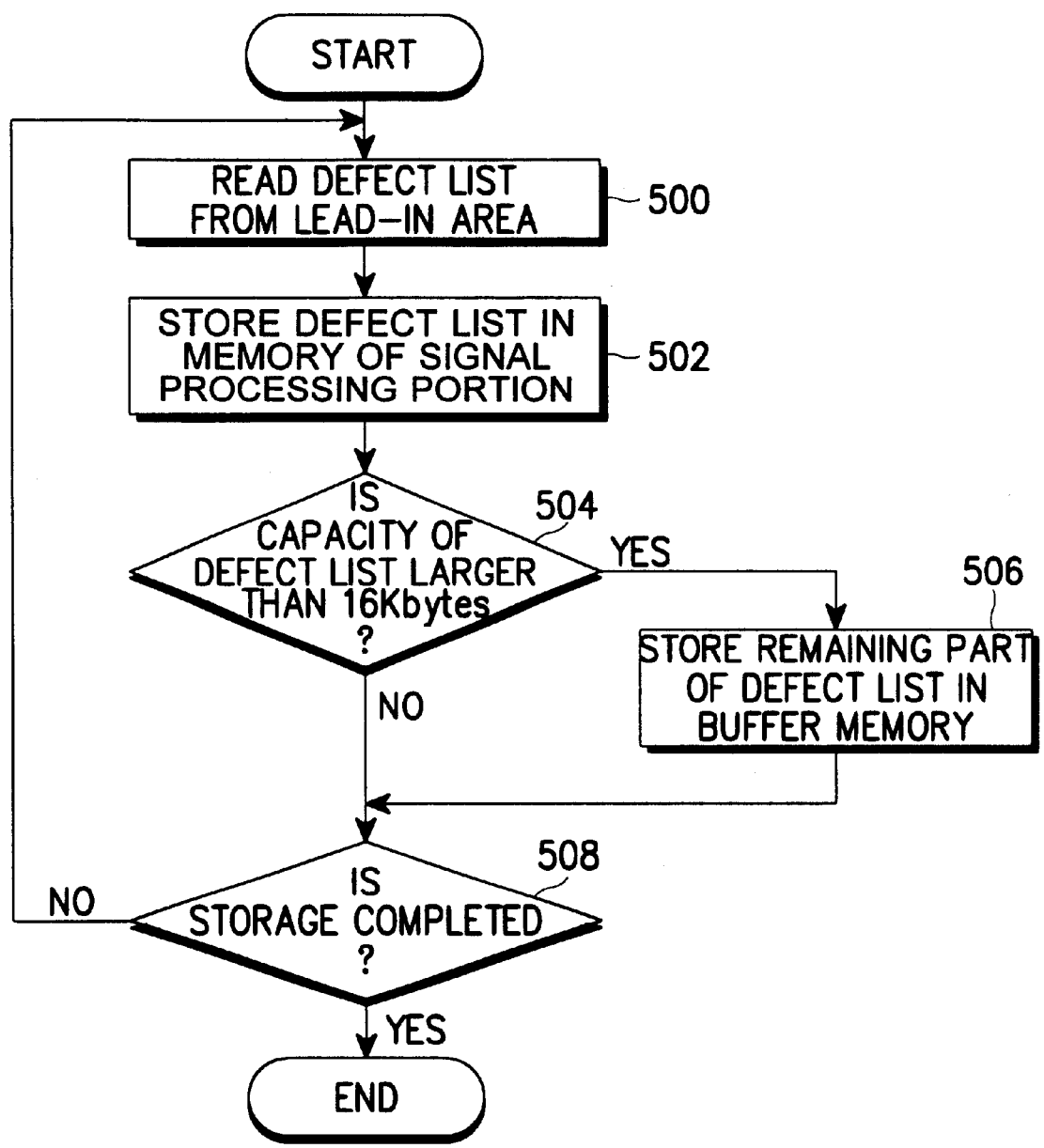
FIG. 5 is a flowchart for storing a defect list according to the embodiment of the present invention.

FIG. 5 is a flowchart for storing a defect list in a lead-in area according to the embodiment of the present invention. The flowchart is programmed in advance to be implemented by the microcomputer 228. Referring to FIGS. 3 and 5, the defect list storing procedure will be described in detail.

If the disk 200 is loaded, the microcomputer 228 reads a defect list from the lead-in area of the disk 200, in step 500. The microcomputer 200 stores the read defect list in the memory 224 of the signal processing portion 236, in step 502, and determines whether the defect list occupies 16 or more Kbytes, in step 504. If the capacity of the defect list exceeds 16 Kbytes, the microcomputer 228 stores part of the defect list in the memory 224 of the signal processing portion 236 and the other part thereof in the ATAPI buffer memory 238, in step 506. On the contrary, if the capacity of the defect list is 16 or less Kbytes in step 504, the microcomputer 228 determines whether the defect list is completely stored, in step 508. If the defect list is not completely stored, steps 500 to 508 are performed. If the defect list is completely stored, the microcomputer 228 terminates the defect list storage procedure.

Use of the memory 224 and the ATAPI buffer memory 238 in the signal processing portion 236 is sufficient for storing the defect list, thereby obviating the need for an additional memory.

Figure 6:
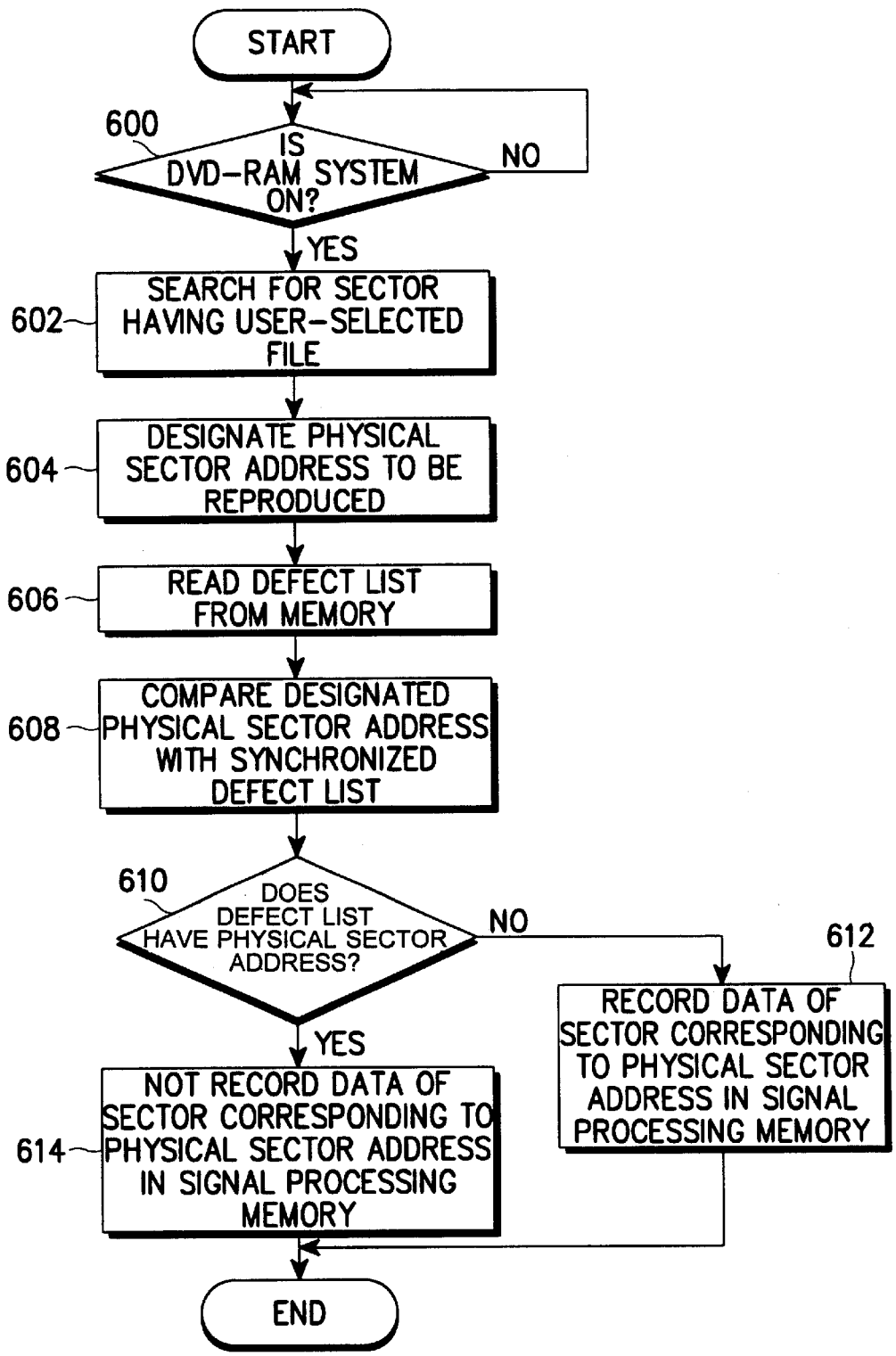
FIG. 6 is a flowchart for processing the data of a defect sector according to the embodiment of the present invention.

FIG. 6 is a flowchart for processing the data of a defect sector in the DVD-RAM system according to the embodiment of the present invention. The defect sector processing procedure will be described by referring to FIGS. 3 and 6.

When a user is to obtain intended data from the DVD-RAM disk, he turns on the DVD-RAM system and inputs the title of an intended file, in step 600. Then, the microcomputer 228 searches for a sector including the file title in step 602, and designates a physical sector address for the searched sector in step 604. The microcomputer 228 reads out the defect list from the memory 224 or the ATAPI buffer memory 238 in step 606. In step 608, the microcomputer 228 compares the physical sector address with the synchronized defect list read in step 606. If the defect list does not have the physical sector address, the microcomputer 228 stores sector data corresponding to the physical sector address in the memory 224, in step 612. On the contrary, if the defect list has the physical sector address, the microcomputer 228 does not store the sector data corresponding to the physical sector address in the memory 224 of the signal processing portion 236, in step 614.

Therefore, use of predetermined areas of the memory 224 and the ATAPI buffer memory 238 is sufficient for storing the defect list, thereby obviating the need for an additional memory.

While the present invention has been described in detail with reference to the specific embodiment, it is clearly to be noted that many variations can be made by anyone skilled in the art within the scope and spirit of the present invention.

What is claimed is:

1. A method of processing data of defect sectors in a data storage system, comprising the steps of:

reading a defect list in a lead-in area of a disk during playback of the disk, and storing the defect list in a predetermined area of a memory of a signal processing portion in the data storage system;

searching for a sector having a title of a user-input file;

designating a physical sector address for the searched sector;

reading the defect list and determining whether the physical sector address is in the defect list;

storing sector data corresponding to the physical sector address in the memory of the signal processing portion if the physical sector address is not in the defect list; and storing no sector data corresponding to the physical sector address in the memory of the signal processing portion if the physical sector address is in the defect list.

2. The method as claimed in claim 1, further comprising the step of storing a remaining part of the defect list in a buffer memory, if a capacity of the defect list is larger than that of the predetermined area of the memory in the signal processing portion.

3. The method as claimed in claim 2, wherein the reading the defect list step comprises the steps of:

reading the part of the defect list stored in the predetermined area of the memory of the signal processing portion; and reading the remaining part of the defect list stored in the buffer memory.

4. The method as claimed in claim 1, wherein:

the data storage system is a digital optical data storage system; and the disk is an optical disk.

5. A method of processing data of defect sectors in a DVD-RAM (Digital Video Disk-Random Access Memory) system, comprising the steps of:

reading a defect list in a lead-in area of a DVD-RAM disk during playback of the DVD-RAM disk, and storing the defect list in a predetermined area of a memory of a signal processing portion in the DVD-RAM system;

searching for a sector having a title of a user-input file;

designating a physical sector address for the searched sector;

reading the defect list and determining whether the physical sector address is in the defect list;

storing sector data corresponding to the physical sector address in the memory of the signal processing portion if the physical sector address is not in the defect list; and storing no sector data corresponding to the physical sector address in the memory of the signal processing portion if the physical sector address is in the defect list.

6. The method as claimed in claim 5, further comprising the step of storing a remaining part of the defect list in an (AT Attachment Packet Interface) ATAPI buffer memory, if a capacity of the defect list is larger than that of the predetermined area of the memory in the signal processing portion.

7. The method as claimed in claim 6, wherein the reading the defect list step comprises the steps of:

reading the part of the defect list stored in the predetermined area of the memory of the signal processing portion; and reading the remaining part of the defect list stored in the ATAPI buffer memory.

* * * * *